(12) United States Patent
Naim et al.

(10) Patent No.: US 9,860,849 B1
(45) Date of Patent: Jan. 2, 2018

(54) TRANSMIT POWER LEVEL ADJUSTMENT FOR WIRELESS DEVICES

(71) Applicant: Sprint Spectrum LP, Overland park, KS (US)

(72) Inventors: Muhammad Ahsan Naim, Ashburn, VA (US); Yu Zhou, Herdon, VA (US); Luca Zappaterra, Eindhoven (NL)

(73) Assignee: Sprint Spectrum L.P., Overland Park, KS (US)

( * ) Notice: Subject to any disclaimer, the term of this patent is extended or adjusted under 35 U.S.C. 154(b) by 0 days.

(21) Appl. No.: 15/135,750

(22) Filed: Apr. 22, 2016

(51) Int. Cl.
*H04W 52/04* (2009.01)
*H04B 15/00* (2006.01)

(52) U.S. Cl.
CPC ............ *H04W 52/04* (2013.01); *H04B 15/00* (2013.01)

(58) Field of Classification Search
CPC . H04W 52/04; H04W 52/146; H04W 52/243; H04W 36/22; H04W 52/343; H04W 52/241; H04W 28/0236; H04W 72/082; H04W 72/1231; H04W 52/08; H04W 52/242; H04W 52/143; H04W 52/367; H04W 72/042

USPC ..... 455/522, 69, 67.11, 67.13, 68, 500, 517, 455/507, 561, 508, 515, 550.1, 426.1, 455/426.2, 445, 453; 370/310, 252, 318, 370/338, 329, 328
See application file for complete search history.

(56) References Cited

U.S. PATENT DOCUMENTS

| | | | |
|---|---|---|---|
| 2011/0195730 A1* | 8/2011 | Chami ................ | H04W 52/244 455/501 |
| 2014/0341123 A1* | 11/2014 | Wong .................. | H04W 52/244 370/329 |
| 2015/0282096 A1 | 10/2015 | Senarath et al. | |

* cited by examiner

*Primary Examiner* — Keith Ferguson

(57) ABSTRACT

A transmit power level of a wireless device is adjusted based on an uplink interference to neighboring sectors caused by the transmit power level. The wireless device can estimate the uplink interference using a reference signal transmitted by each neighboring sector. The uplink interference is based on a loss of signal strength of the reference signal as measured at the wireless device, i.e. a path loss. A determination is made to adjust the transmit power level of the wireless device so as to improve a coverage area of the serving sector, without generating excessive interference in neighboring sectors. Consequently, a transmit power level increase is based on a function of the data demand of the wireless device, the interference caused to neighbors, and the load on neighboring sectors.

19 Claims, 6 Drawing Sheets

TRANSMIT POWER LEVEL ADJUSTMENT FOR WIRELESS DEVICES

TECHNICAL BACKGROUND

Wireless networks typically assign a default transmit power level to wireless devices, for example with reference to uplink transmissions from the wireless device to a sector deployed by an antenna of said access node. Sometimes, wireless devices are capable of higher transmit power levels than the default power levels. Increasing the transmit power level of a wireless device from the default transmit power level generally improves the robustness of an uplink signal, particularly for applications with high data requirements. However, increasing the transmit power level of an uplink transmission from a wireless device can also cause interference with other sectors deployed by neighboring access nodes that have a range proximate to the wireless device. Such signal interference can degrade the transmission of information from the neighboring sectors, and can have a negative impact on voice, data, and other services provided by the neighboring access node.

Overview

Exemplary embodiments described herein include systems, methods, and processing nodes for adjusting a transmit power level of a wireless device based on an interference caused by the transmit power level to neighboring sectors. A method for adjusting a transmit power level includes obtaining a potential interference of a neighboring sector caused by an increased transmit power level of the wireless device. The potential interference is based on a reference signal strength of the neighboring sector measured at the wireless device. When the potential interference is within an interference threshold, the method sets a maximum transmit power level using the increased transmit power level.

Another method for adjusting a transmit power level includes determining a desired transmit power level for the wireless device, determining a path loss of a neighboring sector caused by the desired transmit power level, and adjusting the desired transmit power level based on the path loss.

A system for adjusting a transmit power level includes a processing node and a processor communicatively coupled to the processing node. The processor configures the processing node to execute operations including determining a first path loss of a first neighbor sector, based on the first path loss, determining an interference caused to the first neighbor sector by an increased transmit power level of a wireless device and, based on the interference, adjusting the increased transmit power level of the wireless device.

DETAILED DESCRIPTION

In embodiments disclosed herein, a transmit power level of a wireless device is adjusted based on an uplink interference to neighboring sectors caused by the transmit power level. The requirement to increase the transmit power level may be based on an uplink data demand of the wireless device. The uplink interference is measured at the wireless device. For example, in a time division duplexing (TDD) system, where channel reciprocity is used to transmit uplink and downlink data on the same frequency, a wireless device can estimate the uplink interference caused to neighboring sectors using a reference signal transmitted by each neighboring sector. If the reference signal indicates that the sector is not loaded, then the transmit power level may be increased without an interference determination. If, however, the neighboring sector is loaded beyond a threshold, then the uplink interference is determined based on a loss of signal strength of the reference signal as measured at the wireless device, i.e. a path loss. Based on the measured uplink interference or path loss, a determination may be made as to how much the transmit power of the wireless device can be increased, so as to improve a coverage area of the serving sector without generating too much interference in neighboring sectors. Consequently, a transmit power level increase is based on a function of the data demand of the wireless device, the interference caused to neighbors, and the load on neighboring sectors. These and additional operations are further described with respect to the embodiments depicted in FIGS. 1-6 below.

Figure 1:
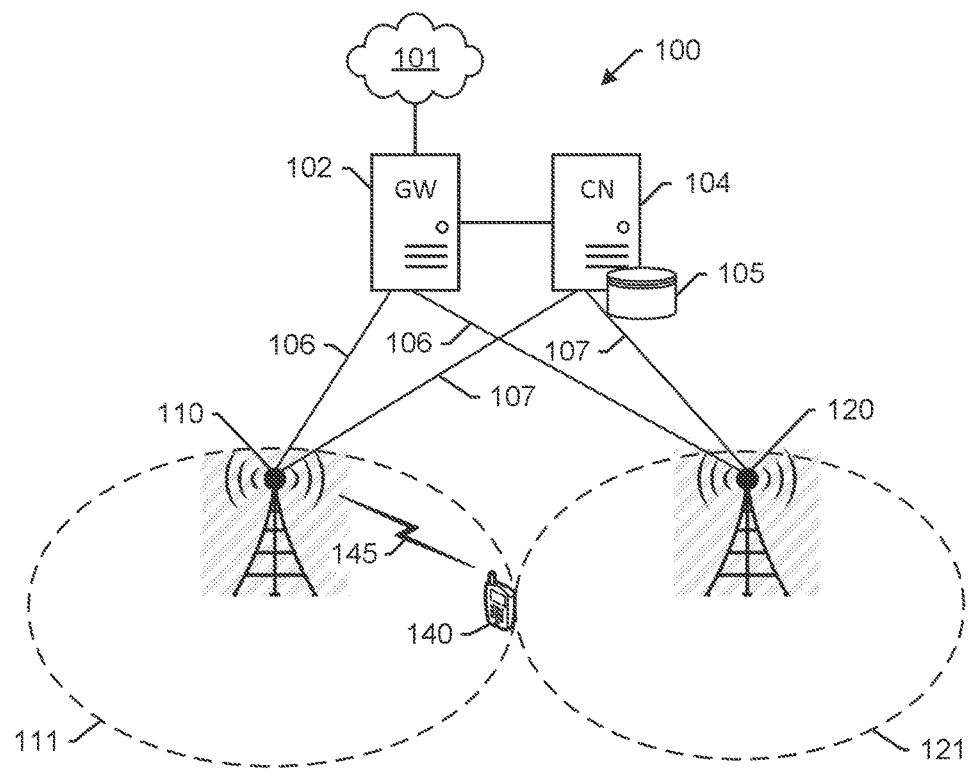
FIG. 1 depicts an exemplary system for transmit power determination.

FIG. 1 depicts an exemplary system 100 for transmit power determination. System 100 comprises a communication network 101, gateway 102, controller node 104, access nodes 110 and 120, and end-user wireless device 140. Access node 110 is illustrated as having coverage area 111, and access node 120 is illustrated as having coverage area 121. End-user wireless device 140 is located within coverage area 111 and accesses network services directly from access node 110 via air interface 145. Further, end-user wireless device 140 is located in close proximity to coverage area 121 and, therefore, may cause interference with a sector deployed by access node 120, particularly if it's transmit power level is increased. This increase may be due to an antenna of wireless device 140 being omnidirectional. Consequently, a transmit power level for wireless device 140 may be determined based on a potential interference caused to access node 120 by the transmit power level. In embodiments described herein, the transmit power level may be determined by the wireless device itself (FIG. 2), or by another network node (FIG. 3) such as access nodes 110, 120, or controller node 104.

Access nodes 110, 120 can be any network node configured to provide communication between wireless device 140 and communication network 101, including standard access nodes and/or short range, low power, small access nodes. For instance, access nodes 110, 120 may include any standard access node, such as a macrocell access node, base transceiver station, a radio base station, an eNodeB device, an enhanced eNodeB device, or the like. In an exemplary embodiment, a macrocell access node can have a coverage area 111, 121 in the range of approximately five kilometers to thirty five kilometers and an output power in the tens of watts. Moreover, it is noted that while access nodes 110, 120 are illustrated in FIG. 1, any number of access nodes and relay nodes can be implemented within system 100. See, for example, embodiment depicted in FIG. 4.

Access nodes 110, 120 can comprise a processor and associated circuitry to execute or direct the execution of computer-readable instructions such as those described with reference to FIGS. 2, 3, 5. Briefly, access nodes 110, 120 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Further, access nodes 110, 120 and relay node 130 can receive instructions and other input at a user interface. Access nodes 110, 120 communicate with gateway node 102 and controller node 104 via communication links 106, 107.

Wireless device 140 may be any device, system, combination of devices, or other such communication platform capable of communicating wirelessly with access nodes 110, 120 using one or more frequency bands deployed therefrom. Wireless device 140 may be, for example, a mobile phone, a wireless phone, a wireless modem, a personal digital assistant (PDA), a voice over internet protocol (VoIP) phone, a voice over packet (VOP) phone, or a soft phone, as well as other types of devices or systems that can exchange audio or data via access nodes 110, 120. Other types of communication platforms are possible.

Wireless device 140 can comprise a processor and associated circuitry to execute or direct the execution of computer-readable instructions to obtain information. Wireless device 140 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Wireless device 140 can receive instructions and other input at a user interface.

Communication network 101 can be a wired and/or wireless communication network, and can comprise processing nodes, routers, gateways, and physical and/or wireless data links for carrying data among various network elements, including combinations thereof, and can include a local area network a wide area network, and an internetwork (including the Internet). Communication network 101 can be capable of carrying data, for example, to support voice, push-to-talk, broadcast video, and data communications by wireless device 140, etc. Wireless network protocols can comprise MBMS, code division multiple access (CDMA) 1×RTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX). Wired network protocols that may be utilized by communication network 101 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 101 can also comprise additional base stations, controller nodes, telephony switches, internet routers, network gateways, computer systems, communication links, or some other type of communication equipment, and combinations thereof.

Communication links 106, 107 can use various communication media, such as air, space, metal, optical fiber, or some other signal propagation path—including combinations thereof. Communication links 106, 107 can be wired or wireless and use various communication protocols such as Internet, Internet protocol (IP), local-area network (LAN), optical networking, hybrid fiber coax (HFC), telephony, T1, or some other communication format—including combinations, improvements, or variations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Communications links 106, 107 may include Si communications links. Other wireless protocols can also be used. Communication links 106, 107 can be a direct link or might include various equipment, intermediate components, systems, and networks. Communication links 106, 107 may comprise many different signals sharing the same link Gateway node 102 can be any network node configured to interface with other network nodes using various protocols. Gateway node 102 can communicate user data over system 100. Gateway node 102 can be a standalone computing device, computing system, or network component, and can be accessible, for example, by a wired or wireless connection, or through an indirect connection such as through a computer network or communication network. For example, gateway node 102 can include a serving gateway (SGW) and/or a public data network gateway (PGW), etc. One of ordinary skill in the art would recognize that gateway node 102 is not limited to any specific technology architecture, such as Long Term Evolution (LTE) and can be used with any network architecture and/or protocol.

Gateway node 102 can comprise a processor and associated circuitry to execute or direct the execution of computer-readable instructions to obtain information. Gateway node 102 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Gateway node 102 can receive instructions and other input at a user interface.

Controller node 104 can be any network node configured to communicate information and/or control information over system 100. Controller node 104 can be configured to transmit control information associated with a handover procedure. Controller node 104 can be a standalone computing device, computing system, or network component, and can be accessible, for example, by a wired or wireless connection, or through an indirect connection such as through a computer network or communication network. For example, controller node 104 can include a mobility management entity (MME), a Home Subscriber Server (HSS), a Policy Control and Charging Rules Function (PCRF), an authentication, authorization, and accounting (AAA) node, a rights management server (RMS), a subscriber provisioning server (SPS), a policy server, etc. One of ordinary skill in the art would recognize that controller node 104 is not limited to any specific technology architecture, such as Long Term Evolution (LTE) and can be used with any network architecture and/or protocol.

Controller node 104 can comprise a processor and associated circuitry to execute or direct the execution of computer-readable instructions to obtain information. Controller node 104 can retrieve and execute software from storage, which can include a disk drive, a flash drive, memory circuitry, or some other memory device, and which can be local or remotely accessible. In an exemplary embodiment, controller node 104 includes a database 105 for storing relationships between different transmit power levels and uplink interferences caused to neighboring sectors. The software comprises computer programs, firmware, or some other form of machine-readable instructions, and may include an operating system, utilities, drivers, network interfaces, applications, or some other type of software, and combinations thereof. Controller node 107 can receive instructions and other input at a user interface.

Other network elements may be present in system 100 to facilitate communication but are omitted for clarity, such as base stations, base station controllers, mobile switching centers, dispatch application processors, and location registers such as a home location register or visitor location register. Furthermore, other network elements that are omitted for clarity may be present to facilitate communication, such as additional processing nodes, routers, gateways, and physical and/or wireless data links for carrying data among the various network elements, e.g. between access nodes 110, 120 and communication network 101.

Figure 2:
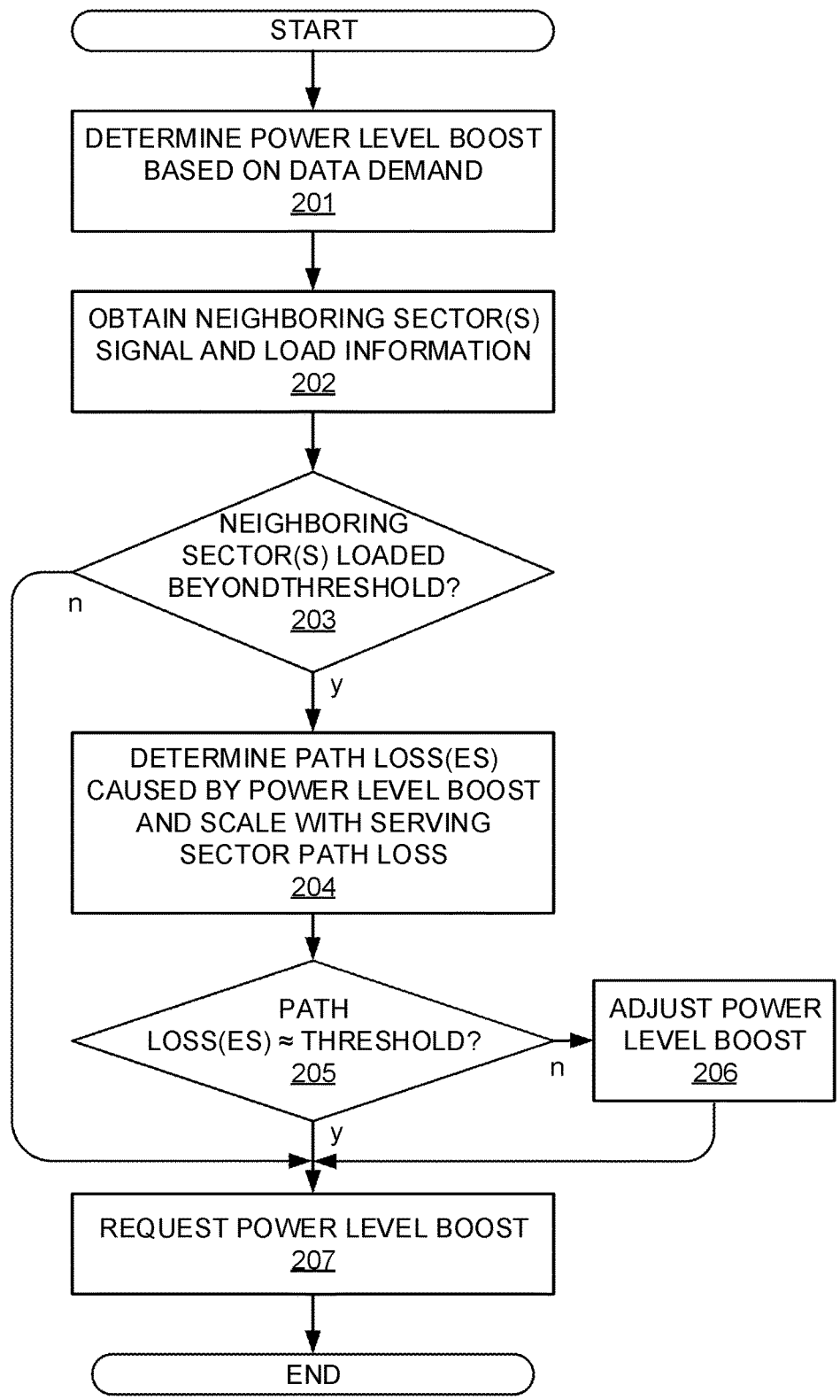
FIG. 2 depicts an exemplary method for transmit power determination.

FIG. 2 depicts an exemplary method for transmit power determination. The method of FIG. 2 is illustrated with respect to a wireless device attached to a serving sector or access node. In other embodiments, the method can be implemented with any suitable network element. Although FIG. 2 depicts operations performed in a particular order for purposes of illustration and discussion, the operations discussed herein are not limited to any particular order or arrangement. One skilled in the art, using the disclosures provided herein, will appreciate that various steps of the methods can be omitted, rearranged, combined, and/or adapted in various ways.

At 201, a determination is made to increase or "boost" a transmit power level of a wireless device. For instance, the transmit power level may need to be boosted to accommodate for an increased throughput or data requirement from an application on the wireless device, such as an uplink data demand. The determination to boost the transmit power level may be performed at the wireless device, or at another network node and communicated to the wireless device. Further, the boost may be an incremental increase based on numerous factors such as device capabilities and data requirements. For instance, different types of wireless devices can have different transmission power capabilities. A network operator typically assigns a transmit power value that represents or is close to a maximum capability of most devices, e.g. the P-MAX variable in LTE networks. If a particular wireless device has a power capability greater than P-MAX, then the particular wireless device (and/or similar devices) can be configured to transmit at a higher transmit power level than P-MAX, including and up to the maximum potential transmit power level of the wireless device.

At 202, signal and load information for neighboring sectors is obtained, enabling the determination of interference caused by any adjustment of the transmit power level and subsequent real-time adjustment thereof. The signal and load information may be received via a broadcast from an access node that deploys the neighboring sector. The neighboring sector may be one of a plurality of sectors deployed by a neighboring access node. Further, a plurality of neighboring sectors may be proximate to the wireless device, each of the plurality of neighboring sectors being deployed by a different neighboring access node. In either case, a reference signal or system information message is received at the wireless device from each neighboring sector, and the signal and load information obtained therefrom. The signal information may include path loss information for enabling a subsequent interference determination in 204, and a load information for determining whether or not to perform path loss determinations in decision 203. Moreover, steps 201 and 202 can be performed in reverse order, or in parallel.

The load information may further be obtained at 202 in several different ways. For example, a neighboring sector may be configured to broadcast loading information in a system information block (SIB) broadcast, which is received by all wireless devices within range of the sector. In other embodiments, the serving sector is configured to communicate directly with neighbor sectors via, for instance X2 signaling, and obtain the loading information for neighboring sectors and transmit this information to the wireless device. The loading information may be communicated to the wireless device via, for instance, RRC signaling. In other embodiments, the wireless device may be barred from entering the sector during a PRACH transmission, if the sector is loaded or congested. This is a simpler method of determining load than the previous two methods.

In either case, at 203, a determination is made as to whether or not path loss/interference determination is needed by comparing the load information with a threshold load. For instance, if there none of the neighboring sectors are loaded then uplink interference is not expected to be a problem, and the method simply requests an increase in the transmit power level at 207. If, however, one or more of the neighboring sectors are loaded beyond the threshold load, then path loss determination operations 204-205 are performed.

At 204, a path loss caused by a transmit power level boost is determined and scaled with a path loss for the currently-serving sector. The path loss determination may be of a potential interference, which is based on a hypothetical transmit power level boost. The hypothetical transmit power level boost may be determined, for instance, in 201, wherein determination 204 is performed prior to requesting the transmit power level boost in 207. A plurality or range of hypothetical transmit power level boosts may be selected in 201, and a corresponding plurality of path losses calculated in 204. Moreover, in 204, path losses for multiple neighboring sectors may be determined. In either case, the path loss can be determined in numerous ways. For instance, the path loss can be based on a strength of a reference signal received from each neighboring sector. The wireless device obtain a reference signal transmit power of when the reference signal was transmitted from the access node deploying the sector, or an antenna thereof. In LTE systems, this may be an EIRP parsed from a SIB message. The wireless device can further measure the receive power or RSRP of the reference signal it receives at its own antenna. A difference between the reference signal transmit power and the receive power of the reference signal received at the wireless device provides a measurement of path loss. In other words, the path loss indicates the difference between what was transmitted and what was received, which in turn indicates an interference caused to the reference signal by the wireless device.

Further at 204, for an uplink interference determination, the path loss of a signal transmitted from the wireless device and received at the neighboring sector's antenna can be estimated, which indicates the uplink interference caused by the wireless device to that particular neighbor. The uplink path loss is estimated based on the path loss of the reference signal measured at the wireless device, as both path losses are caused by the same interference. For example, in a time division duplexing (TDD) system, where channel reciprocity is used to transmit uplink and downlink data on the same frequency, a wireless device can estimate the uplink interference caused to neighboring sectors using the reference signal transmitted by each neighboring sector. As described above, the uplink interference is determined based on a loss of signal strength of the reference signal as measured at the wireless device, i.e. the path loss.

Further at 204, the path loss is scaled based on the path loss of the serving sector to which the wireless device is currently attached. In an embodiment, the path loss of a serving sector S may be determined using any method, and represented as $P_S$. The 0path loss or interference associated with a neighbor N may comprise a value $P_N$. For a hypothetical transmit power level boost, the path loss or interference may be approximated to be $2 \times P_N$. This potential interference can be scaled with a difference between the path loss of the serving sector $P_S$ and the path loss of the neighbor $P_N$. For example, the scaling may use the following formula:

$$\text{Scaled potential } P_N = [2 \times P_N]/[P_S - P_N]$$

Note that the 2× scaling factor for the approximated path loss based on hypothetical transmit power level boost is based on a 3 dB power boost, and is described as such merely for example purposes. The actual values of boost and resultant scaling factor for approximate path loss can vary, and may depend on specific applications and data rate requirements thereof.

At 205, the scaled path loss associated with the one or more neighboring sectors is compared with a threshold to determine how to adjust the transmit power level. In other words, the scaled path loss(es) enable the determination of how much the transmit power of the wireless device can be increased, so as to improve a coverage area of the serving sector without generating too much interference in neighboring sectors. If the threshold is not reached, the transmit power level boost is increased at 206. If the threshold is exceeded, the transmit power level boost is decreased at 206. If the path loss(es) are approximately equal to the threshold, for instance within a +/−10% window of the threshold, then no adjustment may be needed. Consequently, at 207, a transmit power level boost is requested from the network. As described above, the boost may be an incremental increase based on device capabilities and data requirements, and can exceed a P-MAX variable if the wireless device has a power capability greater than P-MAX.

Figure 3:
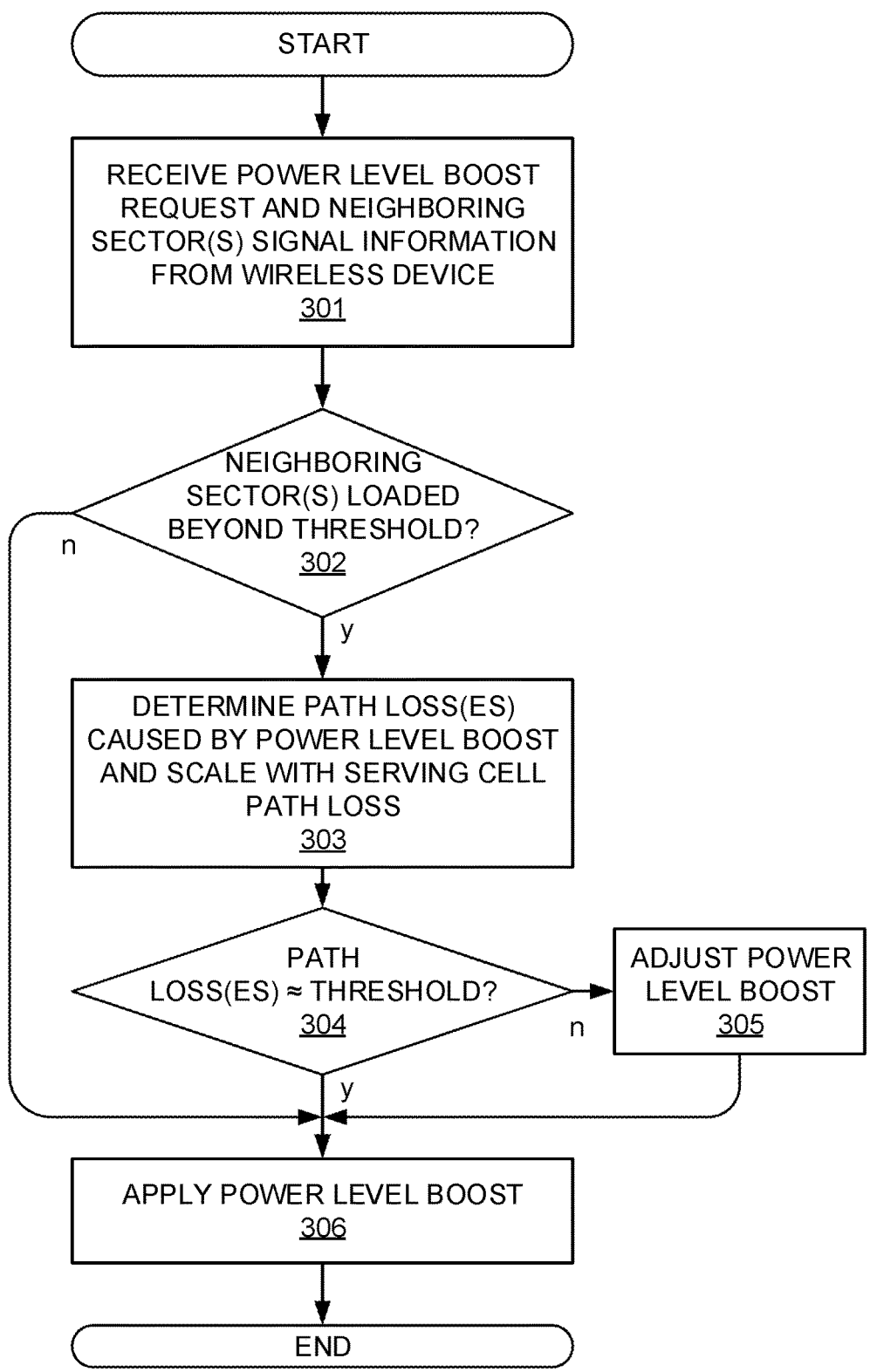
FIG. 3 depicts another exemplary method for transmit power determination.

FIG. 3 depicts another exemplary method for transmit power determination. The method of FIG. 3 is illustrated with respect to a network node, such as an access node providing network access to a wireless device, or a controller node operated by a network operator of the wireless network. In other embodiments, the method can be implemented with any suitable network element. Although FIG. 3 depicts operations performed in a particular order for purposes of illustration and discussion, the operations discussed herein are not limited to any particular order or arrangement. One skilled in the art, using the disclosures provided herein, will appreciate that various steps of the methods can be omitted, rearranged, combined, and/or adapted in various ways.

At 301, a transmit power level boost request is received from a wireless device, along with signal information from one or more neighboring sectors. The transmit power level boost request may be triggered based on a determination at the wireless device to accommodate for an increased throughput or data requirement from an application on the wireless device, such as an uplink data demand. In other embodiments, the determination to boost the transmit power level may be performed at the network and communicated to the wireless device. Further, the boost may be an incremental increase based on numerous factors such as device capabilities and data requirements up to the maximum potential transmit power level of the wireless device, as further described herein. Further, signal information for the neighboring sectors is received, enabling subsequent determinations of interference caused by any adjustment of the transmit power level. The signal information may be received at the wireless device via a broadcast from an access node that deploys the neighboring sector, and forwarded to the network at 301.

At 302, a determination is made as to whether or not a path loss determination is needed, by comparing load information for each neighboring sector with a threshold load. The load information may be obtained in several different ways. For example, the load information may be received at 301 based on the neighboring sectors' broadcast in a system information block (SIB) received by the wireless device. Alternatively, the serving sector or access node is configured to communicate directly with neighbor sectors via, for instance X2 signaling, and obtain the loading information for neighboring sectors. In either case, if none of the neighboring sectors are loaded then uplink interference is not expected to be a problem, and the method simply applies a transmit power level boost at 306. If, however, one or more of the neighboring sectors are loaded beyond the threshold load, then path loss determination and transmit power level boost adjustment operations 303-305 are performed.

At 303, a path loss caused by a transmit power level boost is determined and scaled with a path loss for the currently-serving sector. The path loss determination may be of a potential interference, which is based on a hypothetical transmit power level boost value, such as a value of a transmit power level boost requested at 301. In some embodiments, a plurality or range of hypothetical transmit power level boosts may be determined, and a corresponding plurality of path losses calculated at 303. Moreover, at 303, path losses for multiple neighboring sectors may be determined. In either case, the path loss can be determined in numerous ways. For instance, the path loss can be based on a strength of a reference signal received from each neighboring sector. The strength(s) may be received from the wireless device at 301. For example, the wireless device can measure the receive power or RSRP of the reference signal it receives from each neighboring sector, and determine a difference between the reference signal transmit power (as indicated by a message from the neighboring sector) and the power of the signal received at the wireless device. Alternatively, the network entity performing operation 303 can retrieve the transmit powers of reference signals from each neighboring sector via, for instance, an X2 connection. The difference between what was transmitted and what was received indicates the path loss and/or interference caused to the reference signal by the wireless device. Further, an uplink interference may be estimated based on the path loss described above, as both path losses are caused by the same interference.

Further at 303, the path loss is scaled based on the path loss of the serving sector to which the wireless device is currently attached. In an embodiment, the path loss of a serving sector S may be determined using any method, and represented as $P_S$. The path loss or interference associated with a neighbor N may comprise a value $P_N$. For a hypothetical transmit power level boost, the path loss or interference may be approximated to be $2 \times P_N$. This potential interference can be scaled with a difference between the path loss of the serving sector $P_S$ and the path loss of the neighbor $P_N$. For example, the scaling may use the following formula:

Scaled potential $P_N = [2 \times P_N]/[P_S - P_N]$

Note that the 2× scaling factor for the approximated path loss based on hypothetical transmit power level boost is based on a 3 dB power boost, and is described as such merely for example purposes. The actual values of boost and resultant scaling factor for approximate path loss can vary, and may depend on specific applications and data rate requirements thereof.

At 304, the scaled path loss associated with the one or more neighboring sectors is compared with a threshold to determine how to adjust the transmit power level. In other words, the scaled path loss(es) enable the determination of how much the transmit power level of the wireless device can be increased, so as to improve a coverage area of the serving sector without generating too much interference in neighboring sectors. If the threshold is not reached, the transmit power level boost is increased at 305. If the threshold is exceeded, the transmit power level boost is decreased at 305. If the path loss(es) are approximately equal to the threshold, for instance within a +/−10% window of the threshold, then no adjustment may be needed. Consequently, at 306, a transmit power level boost is applied to the wireless device from the network. As described above, the boost may be an incremental increase based on device capabilities and data requirements, and can exceed a P-MAX variable if the wireless device has a power capability greater than P-MAX.

Figure 4:
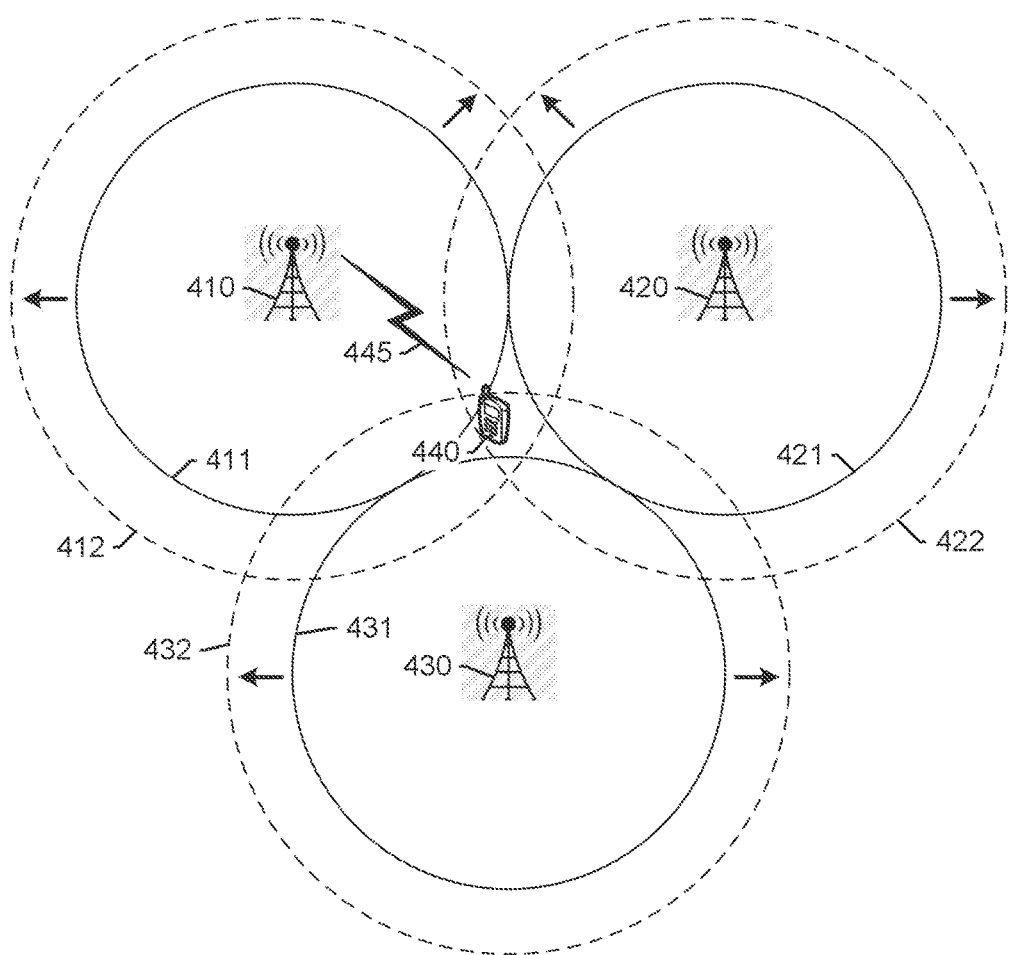
FIG. 4 depicts exemplary coverage areas of a plurality of access nodes.

FIG. 4 depicts exemplary coverage areas of a plurality of access nodes. Access node 410, 420, and 430 can be similar to access nodes 110, 120 described with respect to system 100. In this embodiment, access node 410 is illustrated as having coverage area 411, access node 420 is illustrated as having coverage area 421, and access node 430 illustrated as having a coverage area 431. End-user wireless device 440 is located just within coverage area 411 and accesses network services directly from access node 410 via air interface 445. Further, end-user wireless device 440 is located in close proximity to coverage areas 421 and 431. In embodiments described herein, wireless device 440 may determine that it requires greater coverage from access node 410. The determination may be caused by, for instance, an uplink data requirement of an application running on wireless device 440, and may trigger a request to increase a transmit power level of wireless device 440. The increased transmit power level results in an increase in coverage area of access node 410 from 411 to 412 (dashed line), thereby satisfying the data requirement of the application. However, as described herein, since an antenna of wireless device 440 is typically omnidirectional, the increased transmit power level causes an increase in the effective coverage areas of access node 420 and 430 to 422 and 432, respectively. Owing to the close proximity of wireless device 440 to these increased sector ranges, there is potential for increased interference caused by the increased transmit power level of wireless device 440. Consequently, a transmit power level for wireless device 140 may be adjusted based on a total potential interference caused to access nodes 420, 430 by the transmit power level.

Figure 5:
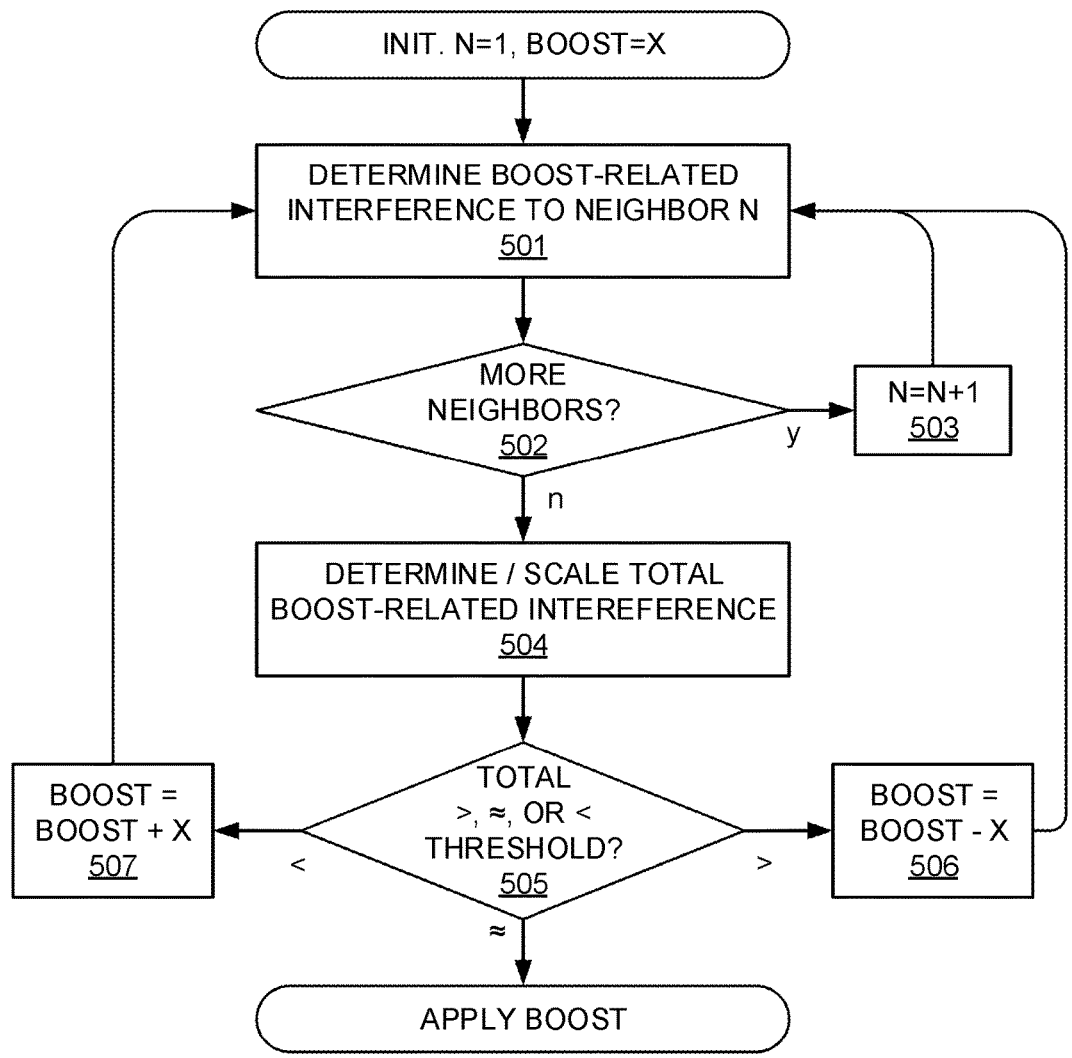
FIG. 5 depicts an exemplary method for transmit power determination given a plurality of access nodes.

FIG. 5 depicts an exemplary method for transmit power level determination given a plurality of access nodes. The method of FIG. 5 is illustrated with respect to any network node in system 100, such as wireless device 140, one of access nodes 110, 120, or controller node 104. In other embodiments, the method can be implemented with any suitable network element. Although FIG. 5 depicts operations performed in a particular order for purposes of illustration and discussion, the operations discussed herein are not limited to any particular order or arrangement. One skilled in the art, using the disclosures provided herein, will appreciate that various steps of the methods can be omitted, rearranged, combined, and/or adapted in various ways.

The method begins with an initialization of variables, including a counter N at N=1, and a default transmit power level boost increment X. The variables may be initialized at any time, including and subsequent to a determination that a transmit power level boost is required or requested by a wireless device. For instance, a network operator can assign a standard transmit power level boost value that is limited by a maximum capability of most devices, e.g. the P-MAX parameter in LTE networks, where X is an increment by which P-MAX is increased or reduced. In either case, at 501, boost-related interference is determined for a first neighboring sector N that is within range of the wireless device requesting the boost. The interference is based on signal and load information of the neighboring sector. Each neighboring sector may be one of a plurality of sectors deployed by a neighboring access node. Further, a plurality of neighboring sectors may be proximate to the wireless device, each of the plurality of neighboring sectors being deployed by a different neighboring access node. In either case, a reference signal or system information message is received at the wireless device from the first (or Nth) neighboring sector, and the signal and load information obtained therefrom. The interference is determined at 501 either at the wireless device or at any network node that receives the signal information from the wireless device.

At 502, a determination is made as to additional neighbors. For instance, if additional neighbors are in close proximity to the wireless device, then at 503, the counter N is increased by one, and the boost-related interference determination 501 is repeated for the N+1th neighbor. If there are no more neighbors the method moves to 504, where a total boost-related interference is obtained and scaled as described herein. For example, the interference caused to each neighboring sector by a hypothetical boost level may be scaled with the path loss of the serving sector, and a sum of the scaled interferences is determined.

At 505, the total scaled path loss associated with all neighboring sectors is compared with a threshold to determine how to adjust the transmit power level. In other words, the scaled path losses enable the determination of how much the transmit power of the wireless device can be increased, so as to improve a coverage area of the serving sector without generating too much interference in neighboring sectors. If the threshold is exceeded, the transmit power level boost is reduced by X at 506, and the method goes back to determining the interference associated with the reduced transmit power level boost at 501. If the threshold is not reached, the transmit power level boost is increased by X at 507, and the method goes back to determining the interference associated with the increased transmit power level boost at 501. If the total interference is approximately equal to the threshold, for instance within a +/−10% window of the threshold, then no adjustment may be needed. Consequently, the method ends with the adjusted transmit power level boost being applied to the wireless device from the network.

The methods, systems, devices, networks, access nodes, and equipment described above may be implemented with, contain, or be executed by one or more computer systems and/or processing nodes. The methods described above may also be stored on a non-transitory computer readable medium. Many of the elements of communication system 100 may be, comprise, or include computers systems and/or processing nodes. This includes, but is not limited to: access nodes 110, 120, wireless device 140, controller node 104, and/or network 101.

Figure 6:
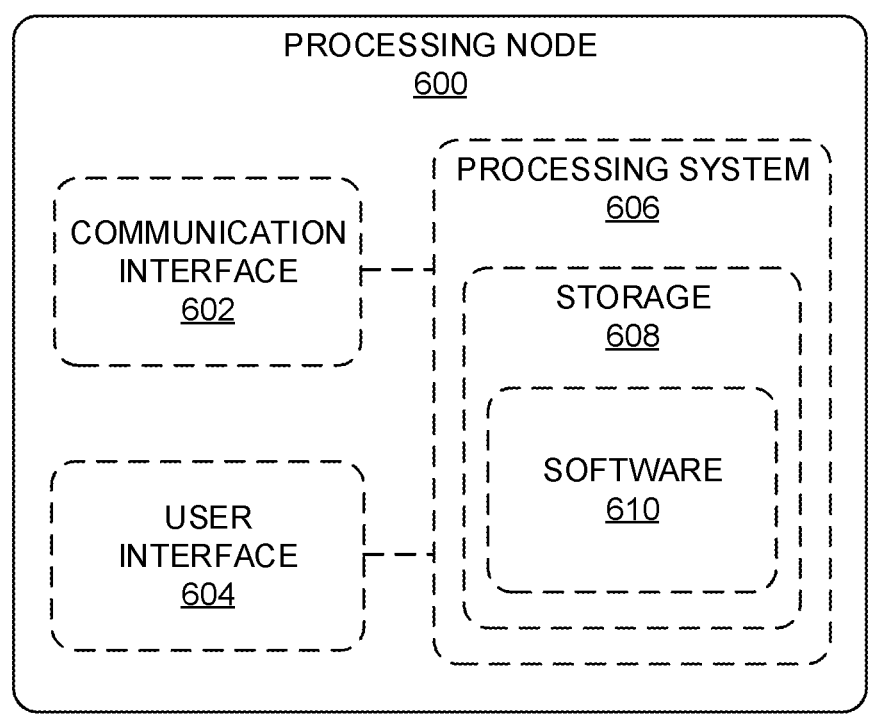
FIG. 6 depicts an exemplary processing node.

FIG. 6 depicts an exemplary processing node 600 comprising communication interface 602, user interface 604, and processing system 606 in communication with communication interface 602 and user interface 604. Processing system 606 includes storage 608, which can comprise a disk drive, flash drive, memory circuitry, or other memory device. Storage 608 can store software 610 which is used in the operation of the processing node 600. Storage 608 may include a disk drive, flash drive, data storage circuitry, or some other memory apparatus. For example, storage 608 may include a buffer. Software 610 may include computer programs, firmware, or some other form of machine-readable instructions, including an operating system, utilities, drivers, network interfaces, applications, or some other type of software. For example, software 610 may include a transmit power level determination module. Processing system 606 may include a microprocessor and other circuitry to retrieve and execute software 610 from storage 608. Processing node 600 may further include other components such as a power management unit, a control interface unit, etc., which are omitted for clarity. Communication interface 602 permits processing node 600 to communicate with other network elements. User interface 604 permits the configuration and control of the operation of processing node 600.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method for determining a transmit power level for a wireless device, the method comprising:
    obtaining a potential interference of a neighboring sector caused by an increased transmit power level of the wireless device, the potential interference being based on a reference signal strength of the neighboring sector measured at the wireless device, wherein obtaining the potential interference is performed upon determining that the neighboring sector is loaded beyond a threshold; and
    when the potential interference is within an interference threshold, setting a maximum transmit power level using the increased transmit power level.

2. The method of claim 1, wherein the potential interference is based on a path loss of a reference signal transmitted by the neighboring sector.

3. The method of claim 2, wherein the path loss is determined by subtracting the reference signal receive power from a reference signal transmit power, the reference signal transmit power being obtained from the neighboring sector.

4. The method of claim 3, wherein the potential interference comprises an estimate of a received signal power received at the neighboring sector of a hypothetical signal transmitted by the wireless device using the increased transmit power level.

5. The method of claim 2, further comprising scaling the potential interference based on a difference between the path loss of the reference signal transmitted by the neighboring sector and a path loss of a serving sector that is currently providing services to the wireless device.

6. The method of claim 5, wherein setting the maximum transmit power level is based on the scaled potential interference.

7. The method of claim 6, wherein the maximum transmit power level is subject to a maximum potential power level for the wireless device.

8. A method for determining a transmit power level for a wireless device, the method comprising:
    determining a desired transmit power level for the wireless device;
    determining a path loss of a neighboring sector caused by the desired transmit power level, wherein determining the path loss is performed upon determining that the neighboring sector is loaded beyond a threshold; and
    adjusting the desired transmit power level based on the path loss.

9. The method of claim 8, wherein the desired transmit power level for the wireless device is based on a data requirement of the wireless device.

10. The method of claim 8, wherein determining that the neighboring sector is loaded beyond the threshold is based on the wireless device receiving loading information for the neighboring sector.

11. The method of claim 8, further comprising determining an interference level based on the path loss.

12. The method of claim 11, wherein adjusting the desired transmit power level is based on the interference level remaining within a threshold interference level.

13. The method of claim 8, wherein the neighboring sector and the serving sector are both deployed by a single access node.

14. The method of claim 8, wherein the neighboring sector and the serving sector are each deployed by separate access nodes.

15. A system for determining a transmit power level, the system comprising:
    a processing node; and a processor communicatively coupled to the processing node, the processor for configuring the processing node to execute operations comprising:

determining a first path loss of a first neighbor sector, wherein determining the first path loss is performed upon determining that the first neighboring sector is loaded beyond a threshold;

based on the first path loss, determining an interference caused to the first neighbor sector by an increased transmit power level of a wireless device; and based on the interference, adjusting the increased transmit power level of the wireless device.

16. The system of claim 15, wherein the first path loss is based on a signal strength of a first reference signal transmitted by the first neighbor sector and measured at the wireless device.

17. The system of claim 16, wherein the operations further comprise determining a second path loss of a second neighbor sector, wherein the second path loss is based on a signal strength of a second reference signal transmitted by the second neighbor sector and measured at the wireless device.

18. The system of claim 17, wherein the operations further comprise determining a total interference caused to the first and second neighbor sectors based on the increased transmit power level.

19. The system of claim 18, wherein the increased transmit power level is adjusted such that the total interference remains below a threshold.

\* \* \* \* \*